United States Patent [19]
Dias

[11] Patent Number: 5,291,090
[45] Date of Patent: Mar. 1, 1994

[54] CURVILINEAR INTERLEAVED LONGITUDINAL-MODE ULTRASOUND TRANSDUCERS

[75] Inventor: J. Fleming Dias, Palo Alto, Calif.

[73] Assignee: Hewlett-Packard Company, Palo Alto, Calif.

[21] Appl. No.: 991,774

[22] Filed: Dec. 17, 1992

[51] Int. Cl.$^5$ .......................................... H01L 41/08
[52] U.S. Cl. ............................... 310/334; 128/662.03;
310/336; 310/359; 310/365; 310/366
[58] Field of Search .................. 310/334–337,
310/366, 365, 358, 359, 800; 128/662.03

[56] References Cited

U.S. PATENT DOCUMENTS

| | | | |
|---|---|---|---|
| 2,875,355 | 2/1959 | Petermann | 310/334 |
| 3,609,602 | 9/1971 | De Vries | 333/72 |
| 4,395,652 | 7/1983 | Nakanishi et al. | 310/334 |
| 4,452,084 | 6/1984 | Taenzer | 310/334 |
| 4,692,654 | 9/1987 | Umemura et al. | 310/334 |
| 4,697,195 | 9/1987 | Quate et al. | 310/334 X |
| 4,865,042 | 9/1989 | Umemura et al. | 310/335 X |
| 4,992,692 | 2/1991 | Dias | 310/334 |
| 5,025,790 | 6/1991 | Dias | 128/66203 |
| 5,160,870 | 11/1992 | Carson et al. | 310/334 X |

OTHER PUBLICATIONS

Viktorov, I. A., Rayleigh and Lamb Waves, 1967, pp. 42–47.
Turnbull, David H. and F. Stuart Foster, Two-dimensional transducer arrays for medical ultrasound: Beamforming and imaging, 1992, pp. 1–13.
Kiyoshi Nakamura et al., Planar transducers using PbTiO$_3$ ceramics for short-pulse ultrasound generation, 1982, pp. 494–497.
Smith, Wallace Arden, New opportunities in ultrasonic transducers emerging from innovations in piezoelectric materials, 1992, pp. 1–24.
Nelson, Craig E., Electrophysical Devices and Systems, 1992, Technical letter.
Lewin, Peter A et al., Integrated Preamplifiers for Ultrasound Tranducers, 1985, pp. 503–506.
DeReggi, A. S. et al., Piezoelectric polymer probe for ultrasonic application, 1981, pp. 853–859.
Newnham, R. E. et al., Composit Piezoelectric Transducers, Materials in Engineering, vol. 2, 1980, pp. 93–106.
van der Pauw, L. J., The Planar Transducer–A New Type of Transducer for Exciting Longitudinal Acoustic Waves, Applied Physics Letters, vol. 9, No. 3 1966.

*Primary Examiner*—Mark O. Budd

[57] ABSTRACT

An ultrasound transducer for intravascular examinations comprises an interleaved series of eccentric elliptical electrodes disposed on the back face of a piezoelectric substrate that has been alternately poled in the thickness dimension. The back face of the transducer is coupled to air, while impedance-matching layers are on the front face of the transducer. The front face is concave spherical to provide a geometric focus. The electrodes are driven at an ultrasound frequency. This arrangement results in a longitudinal-mode ultrasound transmission through the front face of the transducer. The eccentricity of the electrodes precompensates for distortion imposed by a cylindrical window. The pitch (spacing) of the electrodes increases radially, reducing speckling in the ultrasound image. This transducer provides for high-frequency intravascular examinations, and thus correspondingly high-resolution images, without using impractically thin piezoelectric substrates. In addition, the geometric focus, the predistortion, and the speckle-reduction all reduce the artifacts in the resulting high-resolution ultrasound image.

12 Claims, 4 Drawing Sheets

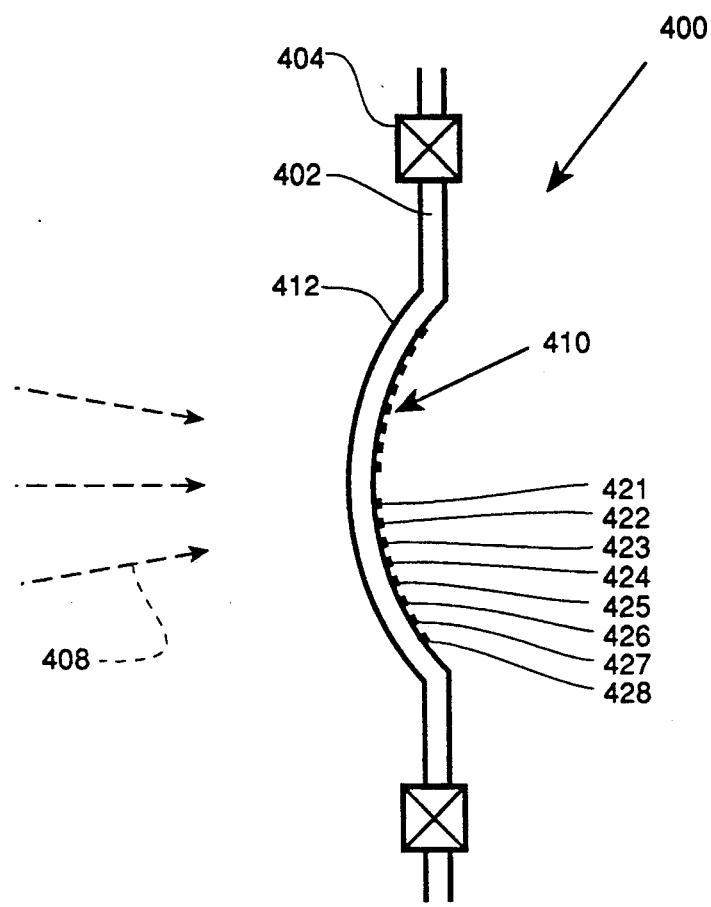
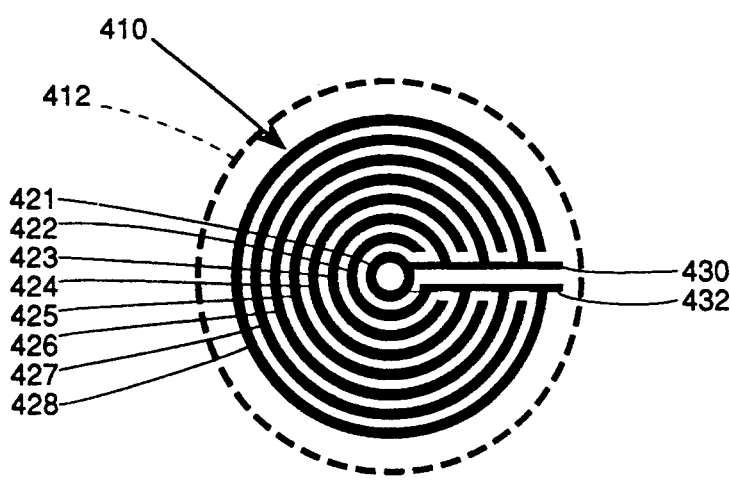
FIG 4A
FIG 4B

CURVILINEAR INTERLEAVED LONGITUDINAL-MODE ULTRASOUND TRANSDUCERS

BACKGROUND OF THE INVENTION

The present invention relates to ultrasonic transducers and, more particularly, to such transducers employing piezoelectric elements. A major objective of the present invention is to provide a small transducer providing for high resolution and relatively artifact-free ultrasound images.

To combat heart disease, a leading cause of death and disability in many countries, physicians require detailed data on the vasculature of the heart. In vivo, intravascular ultrasonic imaging offers a relatively benign method of obtaining such information. Ultrasonic imaging involves transmitting an ultrasonic acoustic wavefront pulse into a body and detecting the reflection of that pulse. Reflections occur at boundaries where acoustic impedance changes. The times at which reflections are received correspond to the depths of these impedance boundaries. By stepping a transducer through a selected angle, one can obtain a two-dimensional (angle and depth) ultrasound image that is essentially a map of impedance boundaries. The intensity and position of these impedance boundaries can then be interpreted to characterize the condition of a vessel and its immediate environment.

The quality of the image is strongly affected by its resolution, which is in turn determined by the ultrasound wavelengths used to examine a body. Shorter wavelengths, which correspond to higher frequencies, provide higher resolution images. Higher frequencies attenuate more rapidly, limiting their use for depth examinations. Accordingly, high frequency transducers are most appropriate for high-resolution near-field imaging. For example, whereas 5–20 MHz ultrasound frequencies are useful for prenatal and peripheral vessel examinations, 40 MHz and higher are desired for intravascular examinations of vessel walls.

Most intravascular and intracavity ultrasound transducers are conventional "thickness-mode" types with electrodes disposed on longitudinally (axially) opposing faces of a piezoelectric substrate. Prior to use, these transducers are "poled" by applying a strong electric potential between the electrodes, polarizing the piezoelectric substrate. In operation, a periodically varying potential difference is applied between the electrodes, causing the piezoelectric substrate to vibrate longitudinally at the alternation frequency. Typically, a back transducer face interfaces with air or a low acoustic impedance absorber-backing; a front transducer face interfaces with an impedance matching material. This configuration causes an ultrasound wavefront to be propagated longitudinally through the front face. The transducer faces can be flat; alternatively, a preset geometric focus can be implemented by using spherical front and/or rear faces.

The frequency of the ultrasound wavefront is determined by the frequency of the electrical pulses used to excite the piezoelectric material. In a conventional thickness-mode transducer, the efficiency of the transfer of the electrical energy at a given center frequency $f_0$ into the longitudinal ultrasound wavefront is related to the thickness of the piezoelectric substrate. The relationship between resonant frequency $f_0$ and substrate thickness t is given by $f_0 = V_L/2t$, where $V_L$ is the longitudinal velocity of an acoustic wavefront in the piezoelectric material. This resonance relationship dictates that thinner piezoelectric substrates are required for higher frequencies. For example, a 20 megaHertz (MHz) piezoelectric substrate is about 0.1 millimeters (mm) thick, while a 40 MHz is about 0.05 mm thick. The thin piezoelectric substrates required for higher frequencies are difficult to fabricate using conventional lapping and polishing techniques. Yields can be low and, therefore, costs are high.

In addition, at such small thicknesses, piezoelectric crystal grain size limits efficiency; this reduced efficiency lowers overall image intensity and therefore increases the relative noise level in the image. Bulk piezoelectric materials are commonly formed by sintering fine ferroelectric particles together. The bulk ferroelectric material is lapped and polished to define a substrate. Electrodes are disposed on opposite faces of the substrate. A voltage differential is imposed between the electrodes to pole the ferroelectric substrate so that it becomes piezoelectric. The ferroelectric particles at the substrate surfaces can be sufficiently disrupted by the lapping and polishing that they impair the piezoelectric quality of the substrate. The percentage of surface particles to all particles in a substrate increases with decreasing substrate thickness. For very thin substrates, the percentage of disrupted surface particles can significantly degrade image quality. This degradation can be reduced by using finer-grain ferroelectric particles, but remains a constraint on transducer design frequencies.

Interdigitated transducers offer a high-frequency alternative to conventional thickness-mode transducers. Interdigitated transducers have two electrodes on one face of a piezoelectric substrate. Each electrode has a number of straight-line segments that are suggestive of fingers or "digits". The straight-line segments of each electrode are interleaved with those of the other electrode; in other words, the fingers of the two electrodes are "interdigitated".

Generally, interdigitated transducers are poled by applying a strong constant potential across opposing faces, as is done with conventional thickness-mode transducers. This thickness-dimension poling results in a piezoelectric character optimized for thickness mode operation. In operation, an alternating potential is applied between the interdigitated electrodes formed on the "back" face of the transducer. This causes surface acoustic waves to be propagated. In addition, some oblique longitudinal waves are propagated.

By poling an interdigitated transducer using the interdigitated electrodes, the piezoelectric substrate can be made to alternate poling orientations on the same pitch as the interdigitated transducers. When the interdigitated transducers are excited, a nonoblique longitudinal wavefront is generated that propagates through the piezoelectric substrate and out the front face, thus emulating a conventional thickness-mode transducer. In this case, efficient energy coupling is dependent on the relation of the excitation frequency and the pitch of the interdigitated electrodes, and not on the substrate thickness. Hence, high frequency thickness-mode transducers have been provided that are not subject to the fragility and granular effects afficting conventional thickness-mode transducers. Longitudinal interdigitated electrodes are discussed by L. J. van der Pauw, "The planar transducer—a new type of transducer for exciting longitudinal acoustic waves", *Applied Physics Let-*

*ters*, Vol. 9, No. 3, Aug. 1, 1966, pp. 129-131, and Kiyoshi Nakamura, Hirsohi Shimizu and Nobuaki Sato, "Planar transducers using PbTiO3 ceramics for short pulse ultrasound generation", 1982 *Ultrasonics Symposium* (A), pp. 484-497.

The higher frequencies afforded by interdigitated transducers promise higher resolution images. However, the attainment of higher resolution images increases the importance of certain image artifacts than could be overlooked at lower resolutions. One of these artifacts is related to imperfect focus. The problem with focus is aggravated with interdigitated transducers. Whereas, conventional thickness-mode transducers can be fabricated on substrates with spherical surfaces to provide a well-defined focus, it is difficult to achieve comparable focal definition using thickness-mode interdigitated transducers.

A second artifact of concern relates to distortion of the ultrasound wavefront. Typically, a circular wavefront is transmitted through a cylindrical window. A cylindrical window distorts the wavefront differently in the "steering" plane orthogonal to the windows axis than in a "azimuthal" plane orthogonal to the steering plane. This distortion renders an ultrasound image harder to interpret. Postprocessing can correct some of the distortion, but can delay image rendering. The delay can interfere with the realtime availability of the image, diminishing its value to the physician.

A third artifact is speckle, the presence of twinkling elements in an image. Twinkling image objects can be difficult to interpret. Stop action photos can catch a twinkling image object at either a bright or a dim portion of its cycle. In either case, the stop action representation is deceptive. Speckle is the result of the beating of different reflections that have undergone slightly different phase shifts upon reflection.

While focusing artifacts, distortion, and speckle plague all ultrasound images, they tend to be more salient in high resolution images. To the extent that high resolution imaging is attainable, artifact reduction becomes increasingly important. Accordingly, what is needed is a robust high-frequency ultrasound transducer suitable for intravascular and other medical applications that provides for artifact reduction.

SUMMARY OF THE INVENTION

The present invention provides an ultrasound transducer with a series of substantially parallel curvilinear, closed or quasi-closed, electrode segments formed on a back face of a piezoelectric substrate. The transducer can be used for transmission or reception or both. An interface is provided at the front face of the substrate to facilitate coupling of a longitudinally transmitted ultrasound wavefront into a body for examination.

The electrode segments can be elliptical, which in the limit of coincident foci, includes circular. The electrode segments can be closed or quasi-closed. "Quasi-closed" herein refers to a segment that subtends an angle of at least 270 degrees about a point. Quasi-closed segments can be employed to provide coplanar electrical access. Alternatively, the quasi-closed segments can be portions of an interleaved pair of spiral electrodes, with one turn of each spiral corresponding to an electrode segment. Polygonal and other closed and quasi-closed geometries are provided for as well.

The substrate can be of PZT, or lead titanate, or other ferroelectric ceramic. Preferably, the material has a relatively large value for the $K_{33}$ coupling coefficient and a relatively small value for the $K_{31}$ coupling coefficient. Alternatively, organic piezoelectric materials can be used such as polyvinylidene difluoride/trifluoroethylene P(VDF-TrFe) copolymer. Hybrid ceramic and polymer transducers can also be used.

The present invention provides for longitudinal mode transmissions of wavefronts of selectable shapes and energy distributions. For example, a concentric series of circular electrodes can be used to produce a longitudinal wave of circular symmetry. A series of noncircular elliptical electrodes with common axes can be used to produce a longitudinal wavefront of elliptical symmetry. By aligning the major axes of the elliptical electrodes having an appropriate eccentricity with the (steering) plane orthogonal to the axis of a cylindrical window, one can attain a circular wave after distortion by the window. In effect, the eccentricity precompensates for the window's distortion. The result is an image with less distortion; this reduced distortion is achieved without time-consuming postprocessing.

The electrode series can have a constant pitch to optimize energy coupling for the corresponding excitation frequency. The relationship of frequency $f_0$ to the pitch is given by $f_0 = V_{sw}/2d$, where $V_{sw}$ is the velocity of surface acoustic waves in the piezoelectric material and d is the distance between adjoining segments of the curvilinear interleaved transducer. Note that the frequency $f_0$ does not depend on the thickness of the substrate.

Alternatively, electrode pitch can vary. For example, pitch can increase monotonically radially outward. Inwardly increasing and non monotonically varying pitches are also provided for. Varying the pitch results in a wavefront in which frequency varies radially. The varying frequency decreases the likelihood of reflections beating against each other to produce speckle in the image. Varying electrode segment pitch also reduces interference from incidental substrate surface waves, which are rendered incoherent by the varying pitch.

The piezoelectric substrates can have flat parallel faces. However, the back face and/or the front face can be curved, e.g., spherical, to provide a geometric focus for the transducer. The circular electrodes are more amenable to this feature than are the straight interdigitated electrodes of the prior art.

Another advantage of the present invention is that opposing electrodes are on the same side of the substrate. This makes for more convenient electrical access. In addition, the front face can be free of conductors. Whereas, in conventional longitudinal transducers, conductive matching layers are required, the present invention permits nonconductive matching layers to be used. This provides greater flexibility to select materials to meet other design criteria.

Thus, the present invention provides for high-frequency thickness-mode ultrasound transducers that can generate and detect acoustic wavefronts of arbitrary cross-section and arbitrary energy distribution, can accommodate geometric foci, can provide for reduced speckle, and can precompensate for known distortions. All these advantages contribute to a higher quality high-resolution image. These and other features and advantages of the present invention are made apparent by the description below with reference to the following drawings.

BRIEF DESCRIPTION OF THE DRAWINGS

FIG. 4A is a schematic side sectional view of an hydrophone in accordance with the present invention.

FIG. 4B is a schematic back plan view of the hydrophone of FIG. 4A showing its quasi-closed circular electrodes.

DESCRIPTION OF THE PREFERRED EMBODIMENTS

Figure 1A:
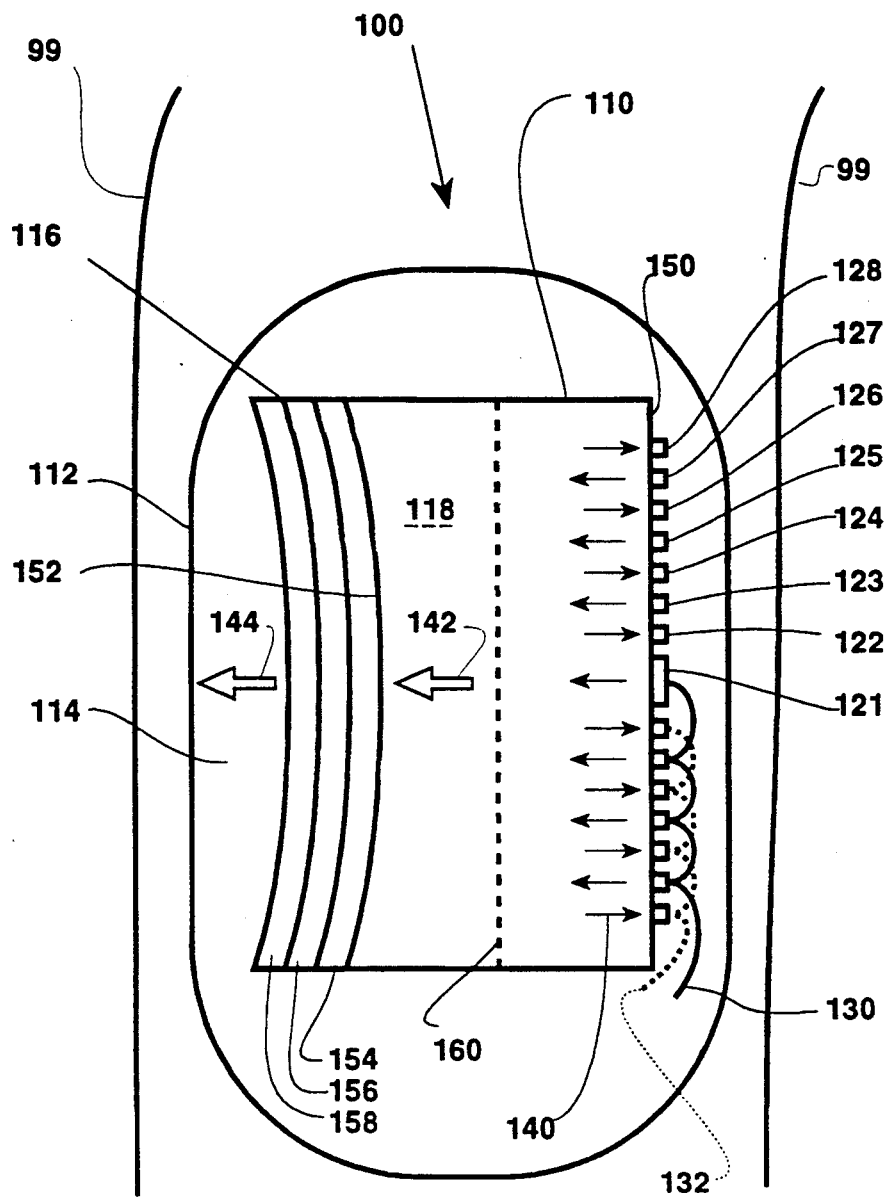
FIG. 1A is a schematic side sectional view of a transducer in accordance with the present invention.

In accordance with the present invention, a transducer assembly 100 for examining a two millimeter (mm) outer diameter artery 99 comprises a transducer 110, a window 112 and a coupling fluid 114, as shown in FIG. 1A. Transducer 110 comprises a triple matching layer 116, a fine-grained high-density piezoelectric substrate 118 alternatively poled in the thickness dimension, and a series of substantially parallel curvilinear electrodes 121-128.

Figure 1B:
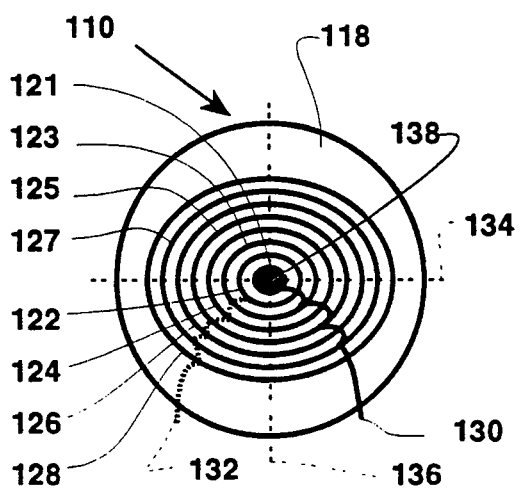
FIG. 1B is a schematic back plan view of the transducer of FIG. 1 showing its closed eccentric elliptical electrodes.

Electrodes 121-128 collectively comprise two subseries: an "odd" subseries 121, 123, 125 and 127, and an "even" subseries 122, 124, 126, and 128, as indicated in FIG. 1B. Electrode 121 is a solid or "spot" electrode, while electrodes 122-128 are "hollow" electrodes. Odd-series electrodes 121, 123, 125 and 127 are electrically shorted to each other by "odd" stitch bonding 130; even-series electrodes 122, 124, 126 and 128 are electrically shorted to each other by "even" stitch bonding 132 (shown by a dashed line in to render it more distinct). All electrodes 121-128 are eccentric ellipses and share a common major axis 134 and a common minor axis 136. Electrodes 121-128 also share a common center point 138, being the intersection of axes 134 and 136 as well as the average location of the foci of elliptical electrodes 121-128.

Series 121-128 is characterized by a linearly increasing pitch from 0.0268 mm (between electrodes 121 and 122) to 0.0282 (between electrodes 127 and 128), with an average pitch of 0.0275 mm. This pitch configuration is optimized for an operating frequency range from 41 MHz to 39 MHz, centered on 40 MHz. This frequency distribution reduces the likelihood of beating reflections, and thus of speckle in a reconstructed image.

Piezoelectric substrate 118 is alternately poled in the thickness dimension as indicated by arrows 140 in FIG. 1A; this poling provides for longitudinal-mode propagation in the thickness direction as indicated by internal acoustic wavefront arrow 142 and external acoustic wavefront arrow 144. This poling is effected by applying a strong constant electric potential, e.g., 4000-5000 V per millimeter of pitch, between odd subseries 121, 123, 125 and 127, and even subseries 122, 124, 126 and 128. The average pitch for series 121-128 is 0.0275 mm; accordingly, a poling of voltage of 110-137 V is used.

During poling, substrate 118 is maintained in a vacuum at a temperature of 100° C. Alternatively, poling can be effected in liquid freon at a temperature of 40° C. Other environments and intermediate temperatures can be used. Prior to poling, substrate 118 is ultrasonically cleaned in a bath of acetone and then in alcohol for about 20 minutes. This ensures that the spaces between adjacent electrodes are free from any sediment to prevent an electrical breakdown between the electrodes.

As a result of this poling procedure, the pitch of the alternating poling vectors tracks the pitch of electrode series 121-128. The alternate poling proves for the thickness mode operation when electrode series 121-128 is excited at the appropriate frequency. While transducer 100 is designed to operate at 40 MHz, appropriate modifications to electrode pitch can provide for the full range of frequencies, e.g., 15 MHz to 80 MHz, utilized for intravascular and intracavity imaging.

Substrate 118 has a planar back surface 150 and a spherical concave front surface 152 providing a geometric focal length of 0.925 mm. This focal length can be optimized for depth range of in the vicinity of 0.8 mm to 1.00 mm by changing the center frequency of the excitation signal applied to electrodes 121-128. For transducer 100, this range can be achieved by adjusting the operating center frequency from 38 MHz to 42 MHz.

Triple matching layer 116 includes three nonconductive sublayers 154, 156, and 158 that conform to substrate front surface 141. These matching layers are selected to provide a gradual transition between the impedance associated with piezoelectric substrate 118 and coupling fluid 114. Coupling fluid 114 and window 112 are impedance matched as far as practical to the blood in artery 99.

Since the center operating frequency of transducer 110 is determined by the average pitch of electrode series 121-128, the thickness of piezoelectric substrate 118 is selected to be small enough to meet application constraints (i.e., the transducer must fit within window which must fit within a blood vessel) and also large enough to minimize image granularity and to provide for high fabrication yields. Depending on the particular intravascular or intracavity application, substrate diameters from 0.5-2.0 mm can be used. To accommodate the 2.0 mm vessel diameters of primary interest herein, substrate 118 is 0.75 mm in diameter and is nominally 0.25 mm thick. Substrate 118 is of lead titanate, which has an advantageously large anisotrophy in coupling coefficients. Lead zirconate titanate (PZT) can be used as an alternative piezoelectric substrate.

Transducer 110 is mechanically steered about a steering axis 160 centered within window 112. Because of its nonspherical, cylindrical geometry, window 112 distorts throughgoing ultrasound wavefronts differently in the steering plane than in the orthogonal azimuthal plane. The common major axis 136 of elliptical electrodes 121-128 is aligned with the steering plane, and the degree of the eccentricity is selected so that the distortion imposed by window 112 on the elliptical wavefront results in a circular wavefront. In effect, the eccentricity of electrodes 121-128 is used to precompensate for distortion imposed by the window. More specifically, the ratios of the electrode dimensions along minor axis 134 and major axis 136 are about 0.7.

In a variation of transducer 100, the common major axis of elliptical electrodes is oriented azimuthally. This orientation is used where the relative dimensions of the window and the transducer are such that energy from either extreme of the steering dimension is lost due to total internal reflection by the window. To increase the efficiency of ultrasound transfer through a window in this circumstance, the eccentricity is used to laterally compress the ultrasound wavefront toward the region where total internal reflection does not occur. Where both total internal reflection and window distortion are of concern, some experimentation can determine the optimal orientation and eccentricity of the ellipses. This experimentation can be performed using a wide-band hydrophone and measuring the beam profile and beam intensity point-by-point.

Figure 2A:
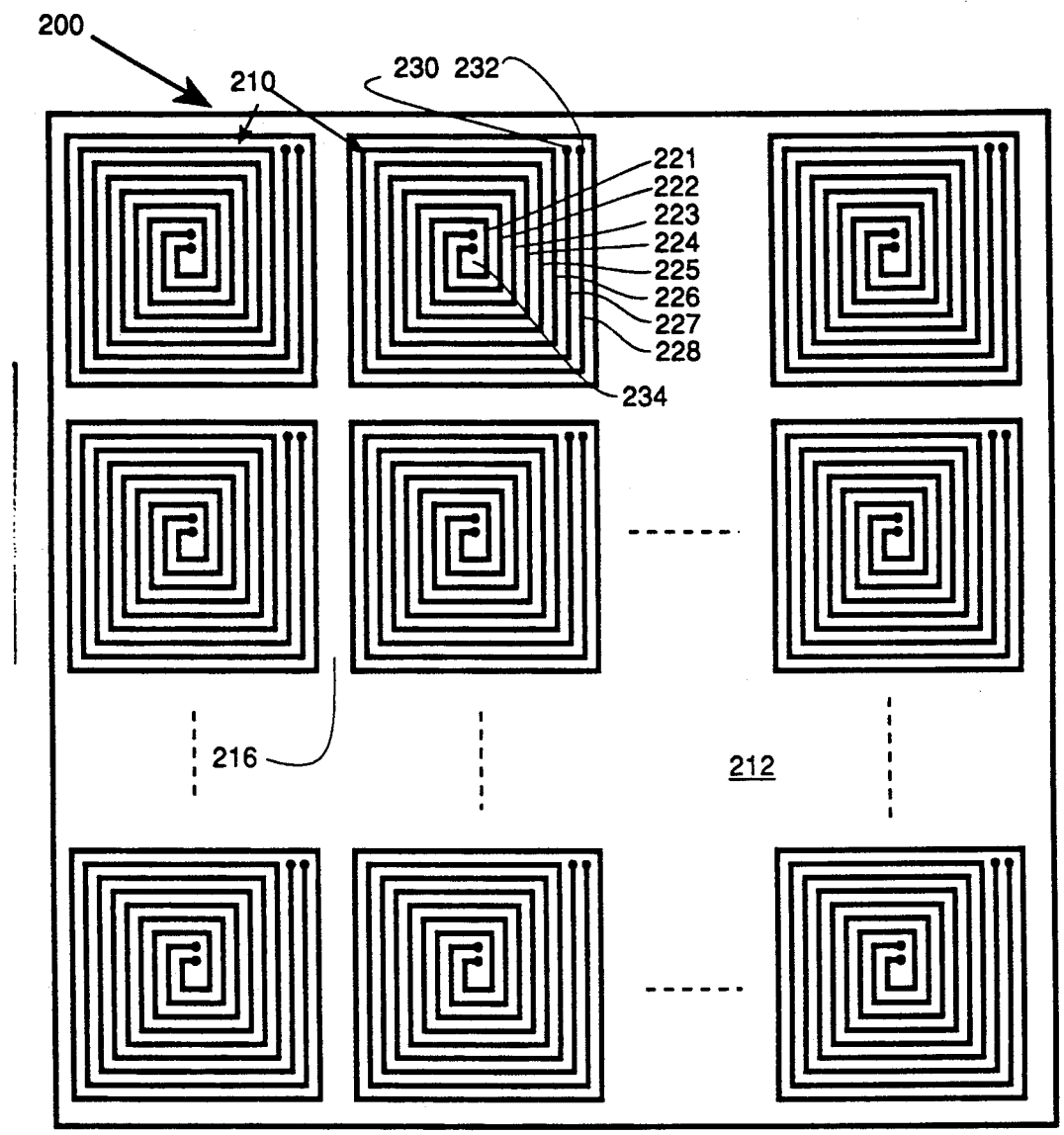
FIG. 2A is a schematic back plan view of a transducer array in accordance with the present invention.

A 100×100 rectangular array 200 in accordance with the present invention comprises 10,000 interdigitated rectilinear spiral interleaved electrode pairs 210 formed on a piezoelectric substrate 212, as indicated in FIG. 2A. Array 200 is designed for external examinations and other applications such as non-destructive testing. Electrode pairs are alternatively poled in the thickness dimension to provide for thickness mode acoustic propagation as indicated by acoustic wavefront arrow 213.

Piezoelectric substrate 212 is 0.25 mm thick. Substrate 212 is of samarium-doped lead titanate, which has a large anisotrophy in the coupling coefficients $K_p$ and $K_t$, e.g., $K_t/K_p = 15$ for Hitachi type PC-11. This high anisotropy provides excellent coupling of electrical energy into the longitudinal mode and reduces cross-coupling between array elements.

Figure 2B:
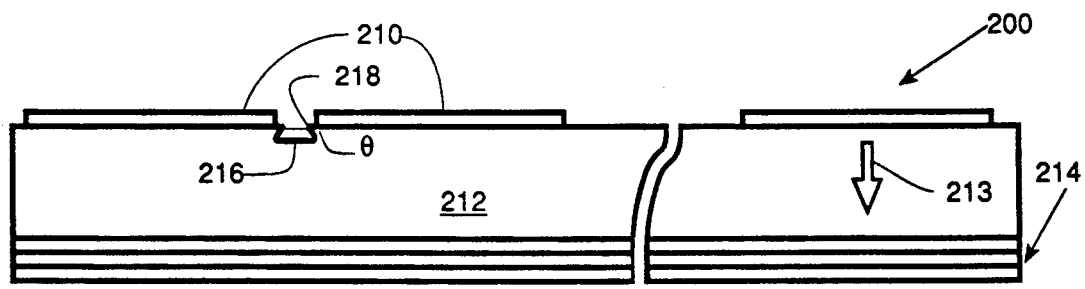
FIG. 2B is a schematic side sectional view of a portion of the array of FIG. 2A.

A triple matching layer 214, shown in FIG. 2B, provides for impedance matching between substrate 212 and a propagation medium. Electrical separation between electrode pairs 210 is enhanced by grooves 216 etched into substrate 212. Grooves 216 narrow toward the top to define an internal angle $\theta = 30°$ and a radius of curvature for a bend 218 of 0.2 $\lambda_{sw}$, where $\lambda_{sw}$ is the wavelength of surface waves generated by electrode pairs 210. These values are identified by I. A. Viktorov, *Rayleigh and Lamb Waves*, Plenum Press, 1967, pp 42–47. Once a surface wave enters a groove 214, it is acoustically absorbed. In this way, electrode pairs 210 are acoustically decoupled from each other.

Each electrode pair 210 includes a series of eight parallel electrode segments 221–228. Electrode segments 221, 223, 225 and 227 constitute an "odd" electrode 230, while electrode segments 222, 224, 226 and 228 constitute an "even" electrode 232. In this sense, electrodes 230 and 232 define subseries of electrode series 221–228. Each electrode segment 221–228 comprises four straight subsegments. Electrode segments 221–228 are open to provide for their spiral geometry. However, they are quasi-closed in that they each subtends more than 270° about a center point 234.

Each electrode pair 210 is individually addressable. By controlling the delay with which electric pulses reach respective electrode pairs, array 200 can be focussed and electronically steered in the horizontal and azimuthal planes. In addition, by exciting different electrode pairs at slightly different frequencies, speckling can be reduced. In this vein, the different electrode pairs 210 can have slightly different pitches.

Figure 3A:
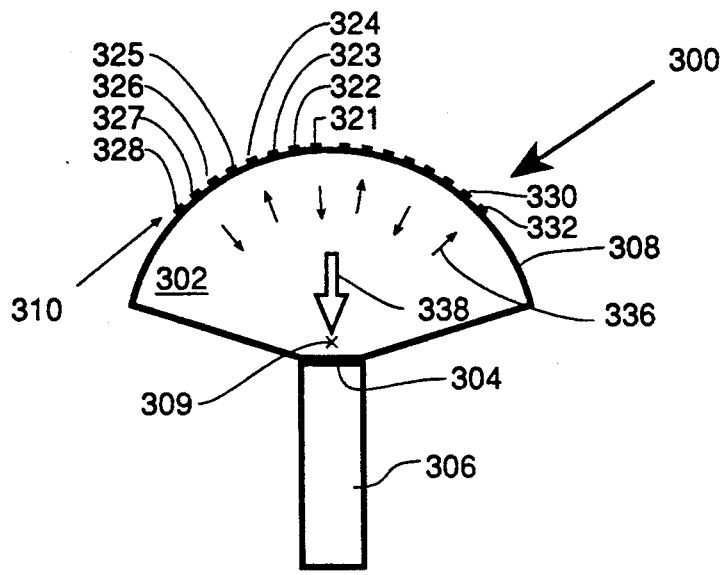
FIG. 3A is a schematic side sectional view of an acoustic fiber coupler in accordance with the present invention.

An acoustic coupler 300 in accordance with the present invention comprises a piezoelectric substrate 302 with an impedance matching front face 304 bonded to an acoustic fiber waveguide 306, as shown in FIG. 3A. Acoustic fiber waveguide 306 serves as an interface for incorporating an intravascular ultrasound imaging sensor. Substrate 302 has a convex spherical back face 308, providing a geometric focal point 309 near the junction of the acoustic fiber and the substrate.

Figure 3B:
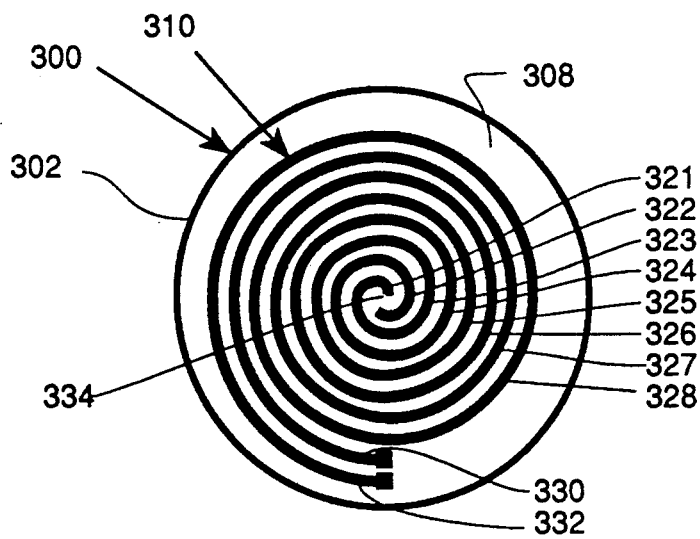
FIG. 3B is a schematic back plan view of the coupler of FIG. 3A showing its spiral electrodes.

A bifilar spiral interleaved electrode pair 310 is formed on back face 308. As shown in FIG. 3B, electrode pair 310 comprises a series of electrode segments 321–328. Electrode segments 321, 323, 325, and 327 constitute an "odd" spiral electrode 330, while electrode segments 322, 324, 326 and 328 constitute an "even" spiral electrode 332. Each electrode segment 321–328 is quasi-closed in that, while open, it subtends more than 270 degrees about a center point 334.

Substrate 302 is poled by imposing a large constant potential difference between spiral electrodes 330 and 332. The alternate poling is indicated by arrows 336. When alternating excitation of the appropriate frequency is applied across electrodes 330 and 332, the resulting longitudinal mode wavefront 338 adds constructively in the direction of geometric focus 309, whence it is coupled into acoustic fiber 306.

A hydrophone 400 in accordance with the present invention includes a P(VDF-TrFe) polymer sheet 402 held in place by a hoop 404. Hoop 404 is 12 centimeters in diameter. Polymer sheet 402 bears an electrode pair 410 at its center, as indicated in FIG. 4A. Hydrophone is optimized for detecting slightly converging acoustic wavefronts 408. The copolymer has a wider frequency response range than piezoelectric ferroelectric materials. This selected copolymer is reasonably impedance matched with water so the copolymer material serves both as impedance matching means and a piezoelectric substrate.

Electrode pair 410 is deposited as vacuum traces while copolymer sheet 402 is flat. After the deposition, copolymer sheet 402 is put in a two part press to create a dimple 412 therein. This dimple 412 is concentric with the 0.5 mm diameter circular interleaved electrode pair 410. This results in hydrophone 400 being quasi-isotropic, i.e., sensitive to acoustic pressures that deviate from the normal axis; accordingly hydrophone is optimized for wavefront 408 that slightly converges toward dimple 412. It is also possible to place an electrode pair on a convex surface of a dimple to improve the sensitivity to slightly diverging directions of acoustic pressures.

Electrode pair 410 comprises a parallel series of electrode segments 421–428. Electrode segments 421, 422, 423, and 424 are electrically coupled via an "odd" conductive bar 430 and thus constitute a collectively driven "odd" subseries of electrically coupled via an "even" bar 432 and thus constitute a collectively driven "even" subseries of series of electrode segments 421–428.

The present invention provides for a range of alternative embodiments. The piezoelectric substrate can be of lead titanate, PZT, or other ceramic materials. Composite piezoelectric transducers, derived from those described by R. E. Newnham et al., Materials in Engineering, Vol. 2, December 1980, can be used. Alternatively, piezoelectric polymer materials can be used.

Hybrids of ceramic and polymer can be used. For example a circular foil of copolymer can be attached to the front of a ceramic disk of slightly larger diameter. Transmitter interleaved electrode pairs can be disposed on the back of the ceramic disk, while a receiver interleaved electrode pair can be disposed on the back of the copolymer. The two interleaved electrode pairs are carefully aligned. Geometric focus can be provided by making the front face of the ceramic concave and spherical. The copolymer can then conform to this curvature. During transmission, the electrode pair on the ceramic is activated to generate a longitudinal mode wavefront that goes past the copolymer and into the target. The ceramic is disabled during reception and the polymer is activated. This ceramic/hybrid arrangement takes advantage of the broadband polymer characteristics during reception of reflected signals, accommodating tissue nonlinearities in acoustic impedance.

The piezoelectric material should be alternately poled in the thickness direction between a front face and a rear face, one of which bears an interleaved electrode pair. Either or both faces can be flat or curved. For example, spherical concave and convex surfaces can be used to provide a finite geometric focus. The cross section of the substrate taken orthogonal to the thickness direction can be square, circular, or otherwise conform to the geometry of the electrode pair.

The electrode pair comprises a series of electrode segments. These segments can be discrete, as is the case of truly elliptical electrodes, or butted to each other, as occurs in a spiral configuration. The segments can be closed in rectangular (including square) and elliptical (including circular) geometries. More complex polygonal and curved geometries are also provided for. The same range of geometries can be left slightly open to provide electrical access to the ends of the electrode segments. These slightly open geometries are quasi-closed in that there is a central point (not necessarily unique) for which each electrode segment subtends at least 270°. Quasi-closed electrode segments also provide for spiral configuration, which can also be rectangular or elliptical, and eccentric or not.

The electrode segments constitute a pair ("odd" and "even") of electrode subseries. Each electrode subseries corresponds to a single electrode (as in a spiral configuration) or a commonly driven subseries of electrode segments (as in an elliptical configuration). Commonly driven electrode segments can be shorted. Alternatively commonly driven electrode segments can be individually addressed to permit slight deviations in frequency and phase. In any event, a constant potential applied between subseries can be used for poling, and out-of-phase alternating frequency potentials applied between subseries can be used to generate longitudinal ultrasound waves.

Electrode pairs can be used alone or in an array. The array can be rectangular permitting two-dimensional steering control as well as focussing. In addition, the circular embodiments of the present invention are especially adapted to use on spherical arrays comprising a radial series of annular transducers. The present invention provides for a circular electrode pair on each annular transducer. Focussing can be controlled by controlling the phase of pulses output by respective annular rings. Steering can be handled mechanically. Electrical access can be had at the back of the rings. Each ring can be separately connected by co-axial cables and individually impedance matched at the distal end. This minimizes crosstalk between rings. Furthermore, each ring can be driven in a push-pull fashion for further cancellation of crosstalk, since crosstalk represents a common mode signal. Once again, electrode pairs can have slightly different pitches and the rings can operate at slightly different frequencies to reduce speckle.

The present invention provides for concentric and nonconcentric electrode segments. For example, a radial series of circular electrode segments can have their centers displaced from one other. For example, a shorted "odd" series of electrodes can have a common center displaced from the common center of an "even" series of electrodes. The effect of this arrangement is to distribute frequencies circumferentially. This approach works equally well with eccentric elliptical electrode segments.

Where a piezoelectric substrate is impedance matched with a body, as is the case with the copolymer of hydrophone 400 in a body of water, the substrate can serve as both substrate and matching means. Where the piezoelectric material is not impedance matched with a body to be examined, a multiplicity of specially tailored matching layers can be used without concern for a common grounding plane connection. These and other modifications to and variations upon the preferred embodiments are provided for by the present invention, the scope of which is limited only by the following claims.

What is claimed is:

1. An ultrasound transducer for acoustically examining a body, said transducer comprising:
    a substrate of piezoelectric material, said substrate having a front surface and a back surface, said substrate being alternately poled in a thickness dimension extending from said back surface toward said front surface;
    first and second radially extending series of substantially parallel curvilinear electrode segments, said first series being electrically isolated from said second series, each of said electrode segments subtending an angle of at least 270° about a central point, said electrode segments being disposed on said back surface; and
    interface means for acoustically coupling said substrate with said body, said interface means being in contact with said front surface.

2. A transducer as recited in claim 1 wherein said electrode segments are geometrically closed.

3. A transducer as recited in claim 1 wherein said first and second series are constituted by respective first and second spirals, said spirals being interleaved, each of said spirals including plural ones of said electrode segments.

4. A transducer as recited in claim 1 wherein the pitch of said electrode segments is constant.

5. A transducer as recited in claim 1 wherein the pitch of said electrode segments varies.

6. A transducer as recited in claim 1 wherein said front surface is spherical.

7. A transducer as recited in claim 1 wherein said back surface is spherical.

8. An ultrasound transducer comprising:
    a substrate of piezoelectric material, said substrate having a front surface and a back surface, said substrate being alternately poled in a thickness dimension extending from said back surface toward said front surface;
    a radially extending series of substantially parallel curvilinear electrode segments, each of said electrode segments subtending an angle of at least 270° about a central point, said electrode segments being disposed on said back surface, each pair of electrode segments having an odd number of electrode segments between them being shorted together; and
    interface means for acoustically coupling said substrate with said body, said interface means being in contact with at least one of said front and back surfaces.

9. A transducer as recited in claim 1 wherein said substrate is an organic piezoelectric material and wherein said back surface is concave.

10. An ultrasound transducer for acoustically examining a body, said transducer comprising:
- a substrate of piezoelectric material, said substrate having a front surface and a back surface, said substrate being alternately poled in a thickness dimension extending from said back surface toward said front surface;
- a radially extending series of substantially parallel curvilinear electrode segments, each of said electrode segments subtending an angle of at least 270° about a central point, said electrode segments being disposed on said back surface;
- interface means for acoustically coupling said substrate with said body, said interface means being in contact with at least one of said front and back surfaces; and
- means for commonly driving a subseries of said electrode segments, said subseries being selected so that no two electrode segments of said subseries are radially adjacent and so that no two electrode segments of said series and not in said subseries are radially adjacent.

11. A transducer for acoustically examining a body, said transducer comprising:
- piezoelectric means for converting electrical energy into acoustic energy and vice-versa, said piezoelectric means having an array of electrode sites, said piezoelectric means being alternately poled in a thickness direction at each of said sites;
- an array of electrode pairs, each electrode pair being disposed at a respective one of said electrode sites, each electrode pair having a radially extending series of parallel curvilinear segments, each of said electrode segments subtending an angle of at least 270° about a central point of the respective electrode pair, each said series containing first and second subseries of electrode segments, said first and second subseries alternating so that one electrode segment of said first subseries is positioned radially between a consecutive pair of electrode segments of said second subseries, and so that one electrode segment of said second series is positioned radially between each consecutive pair of electrode segments of said first subseries;
- steering means for determining a wavefront direction, said steering means being electrically coupled to each of said electrode pairs for determining relative delays between said electrode pairs; and
- interface means for acoustically coupling said piezoelectric means to said body, said interface means being in contact with said piezoelectric means.

12. A transducer as recited in claim 11 wherein each of said electrode pairs has a respective average electrode segment pitch, a first of said electrode pairs having a different average electrode segment pitch than a second of said electrode pairs.

* * * * *